United States Patent
Baba (10) Patent No.: US 10,697,429 B2
(45) Date of Patent: Jun. 30, 2020

(54) CONTROLLER FOR WIND TURBINE, WIND TURBINE, PROGRAM FOR ROTOR TURNING, AND METHOD OF ROTOR TURNING FOR WIND TURBINE

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 278 days.

(21) Appl. No.: 15/393,819

(22) Filed: Dec. 29, 2016

(65) Prior Publication Data

US 2017/0218920 A1    Aug. 3, 2017

(30) Foreign Application Priority Data

Jan. 29, 2016   (JP) ................................. 2016-015735

(51) Int. Cl.
    *F03D 7/02*        (2006.01)
    *F03D 80/50*      (2016.01)

(52) U.S. Cl.
    CPC ......... *F03D 7/0204* (2013.01); *F03D 7/0224* (2013.01); *F03D 7/0244* (2013.01);
    (Continued)

(58) Field of Classification Search
    CPC .... F03D 7/0248; F03D 7/0204; F03D 7/0224; F03D 7/0244; F03D 7/0264;
    (Continued)

(56) References Cited

U.S. PATENT DOCUMENTS

| 4,084,921 A | 4/1978 | Norz |
| 7,948,100 B2 | 5/2011 | Nies et al. |
| (Continued) | | |

FOREIGN PATENT DOCUMENTS

| EP | 2072814 A2 | 6/2009 |
| EP | 2905407 A1 | 8/2015 |
| (Continued) | | |

OTHER PUBLICATIONS

Europe Patent Office, "Extended European Search Report for European Patent Application No. 16204307.9," dated Jun. 21, 2017.

(Continued)

*Primary Examiner* — Philip E Stimpert
(74) *Attorney, Agent, or Firm* — Manabu Kanesaka; Benjamin Hauptman; Kenneth Berner (57) ABSTRACT

A controller of a wind turbine for causing the wind turbine to perform rotor turning includes: an input part for receiving a target azimuth angle at which a rotor of the wind turbine is to be stopped; and a pitch control part configured to cause the wind turbine to perform a pitch control to stop the rotor at the target azimuth angle. The pitch control part is configured to: control a pitch angle of a wind turbine blade of the wind turbine so that the rotor rotates at a predetermined rotation speed which is constant, in a first period until the rotor reaches a control-switch azimuth angle immediately before the target azimuth angle; and control the pitch angle so that a rotation speed of the rotor decreases from the predetermined rotation speed in a second period after the rotor reaches the control-switch azimuth angle and before the rotor reaches the target azimuth angle.

13 Claims, 8 Drawing Sheets

(52) U.S. Cl.
CPC ......... *F03D 7/0264* (2013.01); *F03D 7/0276* (2013.01); *F03D 80/50* (2016.05); *F05B 2270/1014* (2013.01); *F05B 2270/326* (2013.01); *Y02E 10/723* (2013.01)

(58) Field of Classification Search
CPC .... F03D 7/0276; F03D 80/50; F05B 2270/32; F05B 2270/1014; F05B 2270/329; F05B 2270/326; Y02E 10/723
See application file for complete search history.

(56) References Cited

U.S. PATENT DOCUMENTS

| | | | |
|---|---|---|---|
| 8,271,145 B2 | 9/2012 | Minami et al. | |
| 2004/0076518 A1* | 4/2004 | Drake | F03D 1/00 416/10 |
| 2007/0138796 A1* | 6/2007 | Hornemann | G01R 31/34 290/44 |
| 2008/0290664 A1 | 11/2008 | Kruger | |
| 2009/0196752 A1 | 8/2009 | Friedrich | |
| 2010/0209245 A1* | 8/2010 | Migliori | F01D 17/10 416/1 |
| 2011/0044813 A1 | 2/2011 | Lindberg et al. | |
| 2011/0187107 A1* | 8/2011 | Toyohara | F03D 7/0244 290/44 |
| 2011/0198854 A1 | 8/2011 | Minami et al. | |
| 2014/0010651 A1 | 1/2014 | Nies | |
| 2014/0010951 A1 | 1/2014 | Vargas et al. | |

FOREIGN PATENT DOCUMENTS

| | | |
|---|---|---|
| EP | 2905467 A1 | 8/2015 |
| EP | 2963287 A1 | 1/2016 |
| JP | 5010735 B2 | 8/2012 |
| WO | 2006/007838 A1 | 1/2006 |
| WO | 2010/076900 A1 | 7/2010 |
| WO | 2011/101957 A1 | 8/2011 |
| WO | 2014/097433 A1 | 6/2014 |

OTHER PUBLICATIONS

Europe Patent Office, "Office Action for European Patent Application No. 16204307.9," dated Mar. 16, 2018.
Japan Patent Office, "Office Action for Japanese Patent Application No. 2016-015735," dated Nov. 27, 2017.

* cited by examiner

CONTROLLER FOR WIND TURBINE, WIND TURBINE, PROGRAM FOR ROTOR TURNING, AND METHOD OF ROTOR TURNING FOR WIND TURBINE

TECHNICAL FIELD

The present disclosure relates to a controller for a wind turbine for rotor turning of a wind turbine, a wind turbine, a program for rotor turning, and a method of rotor turning for a wind turbine.

BACKGROUND ART

In a case of a general wind turbine, for instance, when workers enter a rotor head or check on blades for maintenance, a process called rotor turning is performed, in which a rotor of the wind turbine is moved to a desired azimuth angle (see Patent Document 1).

For instance, Patent Documents 2 and 3 disclose controlling the pitch angle of wind turbine blades to perform rotor turning.

CITATION LIST

Patent Literature

Patent Document 1: JP5010735B
Patent Document 2: WO2014/97433A
Patent Document 3: US Patent Application Publication No. 2014/010651

SUMMARY

However, in a case where the pitch angle of wind turbine blades is controlled to perform rotor turning as in the method of rotor turning disclosed in Patent Documents 2 and 3, torque (aerodynamic torque) received by the wind turbine blades from wind varies depending on wind velocity even if the pitch angle is constant, and thus the azimuth angle at which the rotor stops is also affected by wind velocity. Thus, if the limit on the wind-velocity condition for determining whether to perform rotor turning by a pitch control is not strict, it is difficult to stop the rotor accurately at a desired azimuth angle depending on wind velocity.

An object of at least one embodiment of the present invention is to provide a controller for a wind turbine, a wind turbine, a program for rotor turning, and a method of rotor turning for a wind turbine, whereby it is possible to improve the accuracy in stopping the rotor at a target azimuth angle regardless of an influence from wind velocity even if the limit on the wind-velocity condition for determining whether to perform rotor turning on the wind turbine is not strict.

(1) A controller of a wind turbine for causing the wind turbine to perform rotor turning, according to at least some embodiments of the present invention, comprises: an input part for receiving a target azimuth angle at which a rotor of the wind turbine is to be stopped; and a pitch control part configured to cause the wind turbine to perform a pitch control to stop the rotor at the target azimuth angle. The pitch control part is configured to: control a pitch angle of a wind turbine blade of the wind turbine so that the rotor rotates at a predetermined rotation speed which is constant, in a first period until the rotor reaches a control-switch azimuth angle immediately before the target azimuth angle; and control the pitch angle so that a rotation speed of the rotor decreases from the predetermined rotation speed in a second period after the rotor reaches the control-switch azimuth angle and before the rotor reaches the target azimuth angle.

With the above configuration (1), before the rotor is stopped at the target azimuth angle (in the first period), the pitch control is performed so that the rotor rotates constantly at a predetermined rotation speed, and thus the aerodynamic torque at the time when the rotor reaches the control-switch azimuth angle is substantially the same regardless of the wind velocity. Thus, when the pitch control is performed so that the rotor rotation speed decreases in the second period after the rotor reaches the control-switch azimuth angle, the rotor can be stopped more easily at the target azimuth angle regardless of the wind velocity. Thus, even though the limit on the wind-velocity condition for determining whether to perform rotor turning is not strict, it is possible to improve the accuracy in stopping the rotor at the target azimuth angle regardless of an influence from the wind velocity.

(2) In some embodiments, in the above configuration (1), the controller further comprises a calculation part for calculating the control-switch azimuth angle on the basis of at least one of the pitch angle in the first period or a wind-velocity in the first period.

In the first period, the pitch control is performed so as to maintain the rotation speed to be constant, and thus the pitch angle of the wind turbine blades in the first period can be used as an index of the magnitude of the wind velocity.

Accordingly, with the above configuration (2), a control-switch azimuth angle is calculated on the basis of at least one of the pitch angle or the wind velocity in the first period, and thereby it is possible to adjust the time of starting speed reduction of the rotor (the time when the rotor reaches the control-switch azimuth angle) in accordance with the magnitude of the wind velocity. As a result, the rotor can be more easily stopped at the target azimuth angle with high accuracy regardless of the wind velocity.

(3) In some embodiments, in the above configuration (1) or (2), the pitch control part is configured to retrieve the control-switch azimuth angle from a memory storing the control-switch azimuth angle in advance.

With the above configuration (3), complicated calculation is not necessary, and with the above described configuration (1), even if the limit on the wind-velocity condition for determining whether to perform rotor turning is not strict, it is possible to improve the accuracy in stopping the rotor at the target azimuth angle regardless an influence from the wind velocity.

(4) In some embodiments, in any one of the above configurations (1) to (3), the pitch control part is configured to change the pitch angle to a feather side at a constant rate in at least a part of the second period.

With the above configuration (4), since the pitch angle is changed to the feather side at a constant rate in at least a part of the second period, it is unnecessary to perform complicated calculation to obtain a target pitch angle in the second period.

(5) In some embodiments, in any one of the above configurations (1) to (3), the pitch control part is configured to reduce the rotation speed of the rotor at a constant rate in at least a part of the second period.

With the above configuration (5), it is possible to reduce the rotation speed of the rotor at a constant rate in at least a part of the second period, and thus to stop the rotor at the target azimuth angle with high accuracy.

(6) In some embodiments, in any one of the above configurations (1) to (5), the predetermined rotation speed is not less than 0.05 rpm and not more than 1.0 rpm.

With the above configuration (6), since the rotor rotation speed (predetermined speed) maintained to be constant in the first period is in the above range, which is of a relatively low rotation speed, it is possible to shorten the second period, and to reduce aerodynamic torque received from wind at the time of starting speed reduction (the time when the rotor reaches the control-switch azimuth angle), which makes it easier to stop the rotor at the target azimuth angle regardless of the wind velocity.

(7) In some embodiments, in any one of the above configurations (1) to (6), the pitch control part is configured to control the pitch angle in a range defined by a fine-side limit of the pitch angle in the first period.

With the above configuration (7), since the fine-side limit of the pitch angle is set, the pitch angle is positioned relatively close to the feather side at the time of starting the speed reduction (the time when the rotor reaches the control-switch azimuth angle), and thereby the rotor can be more easily stopped at the target azimuth angle regardless of the wind velocity.

(8) In some embodiments, in any one of the above configurations (1) to (7), the controller further comprises a brake control part configured to operate a brake for braking the rotor when the rotor reaches the target azimuth angle.

With the above configuration (8), it is possible to retain the rotor at the target azimuth angle by operating the brake.

(9) In some embodiments, in any one of the above configurations (1) to (8), the controller further comprises a yaw control part for performing a following control on a yaw direction of the rotor in accordance with a wind direction when the pitch angle is controlled in the first period and the second period.

With the above configuration (9), the yaw direction is controlled to follow the wind direction in the first period and the second period, and thereby it is possible to perform rotor turning appropriately by the pitch control regardless of the wind direction.

(10) A wind turbine according to at least one embodiment of the present invention comprises: a rotor; and the controller according to any one of the above (1) to (9) for performing a rotor-turning operation so that the rotor stops at the target azimuth angle.

With the above configuration (10), the wind turbine includes the controller capable of improving the accuracy in stopping the rotor at the target azimuth angle regardless of the wind velocity, and thus it is possible to provide a wind turbine that enables maintenance works with a high efficiency, for instance.

(11) A program for rotor turning for the controller according to any one of the above (1) to (9), according to at least some embodiments of the present invention, is configured to cause the controller to perform: a step of controlling the pitch angle of the wind turbine blade of the wind turbine so that the rotor rotates at the predetermined rotation speed which is constant, in the first period until the rotor reaches the control-switch azimuth angle immediately before the target azimuth angle; and a step of controlling the pitch angle so that the rotation speed of the rotor decreases from the predetermined rotation speed in the second period after the rotor reaches the control-switch azimuth angle and before the rotor reaches the target azimuth angle.

With the above configuration (11), even if the limit on the wind-velocity condition for determining whether to perform rotor turning is not strict, it is possible to improve the accuracy in stopping the rotor at the target azimuth angle regardless of an influence from the wind velocity.

(12) A method of rotor turning for a wind turbine, according to at least some embodiments of the present invention, comprises a stop step of causing the wind turbine to perform a pitch control to stop a rotor of the wind turbine at a target azimuth angle. The stop step further comprises: controlling a pitch angle of a wind turbine blade of the wind turbine so that the rotor rotates at a predetermined rotation speed which is constant, in a first period until the rotor reaches a control-switch azimuth angle immediately before the target azimuth angle; and controlling the pitch angle so that a rotation speed of the rotor decreases from the predetermined rotation speed in a second period after the rotor reaches the control-switch azimuth angle and before the rotor reaches the target azimuth angle.

According to the above method (12), before the rotor is stopped at the target azimuth angle (in the first period), the pitch control is performed so that the rotor rotates constantly at a predetermined rotation speed, and thus the aerodynamic torque at the time when the rotor reaches the control-switch azimuth angle is substantially constant regardless of the wind velocity. Thus, when the pitch control is performed so that the rotor rotation speed decreases in the second period after the rotor reaches the control-switch azimuth angle, the rotor can be stopped more easily at the target azimuth angle regardless of the wind velocity. Thus, even if the limit on the wind-velocity condition for determining whether to perform rotor turning is not strict, it is possible to improve the accuracy in stopping the rotor at the target azimuth angle regardless of an influence from the wind-velocity.

(13) In some embodiments, in the above method (12), the method further comprises a step of calculating the control-switch azimuth angle on the basis of at least one of the pitch angle in the first period or a wind velocity in the first period.

According to the above method (13), a control-switch azimuth angle is calculated on the basis of at least one of the pitch angle or the wind velocity in the first period, and thereby it is possible to adjust the time of starting speed reduction of the rotor (the time when the rotor reaches the control-switch azimuth angle) in accordance with the magnitude of the wind velocity. Accordingly, the rotor can be more easily stopped at the target azimuth angle with high accuracy regardless of the wind velocity.

(14) In some embodiments, in the above method (12) or (13), in the stop step, the pitch angle is changed to a feather side at a constant rate in at least a part of the second period.

According to the above method (14), since the pitch angle is changed to the feather side at a constant rate in at least a part of the second period, it is unnecessary to perform complicated calculation to obtain a target pitch angle in the second period.

(15) In some embodiments, in the above method (12) or (13), in the stop step, the rotation speed of the rotor is reduced at a constant rate in at least a part of the second period.

According to the above method (15), it is possible to reduce the rotation speed of the rotor at a constant rate in at least a part of the second period, and thus to stop the rotor at the target azimuth angle with high accuracy.

According to at least one embodiment of the present invention, even if the limit on the wind-velocity condition for determining whether to perform rotor turning on the wind turbine is not strict, it is possible to improve the accuracy in stopping the rotor at the target azimuth angle regardless of an influence from wind velocity.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
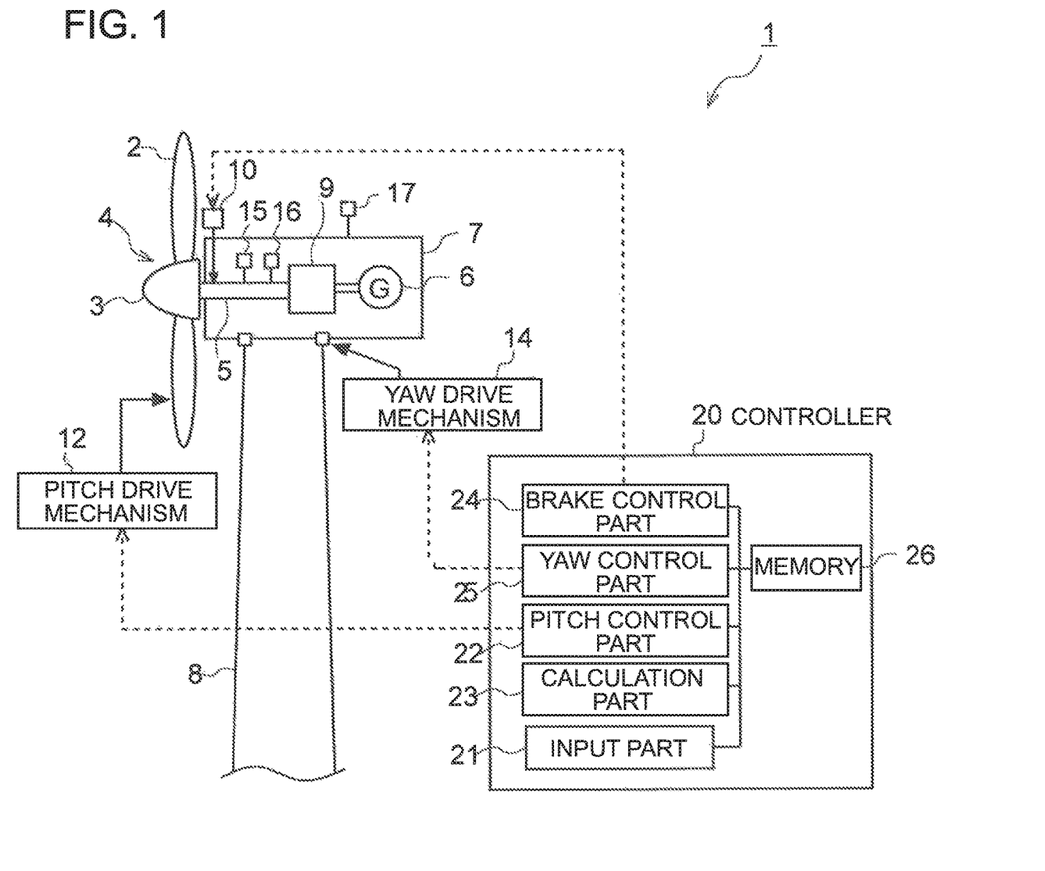
FIG. 1 is a schematic overall configuration diagram of a wind turbine according to an embodiment.
Figure 2:
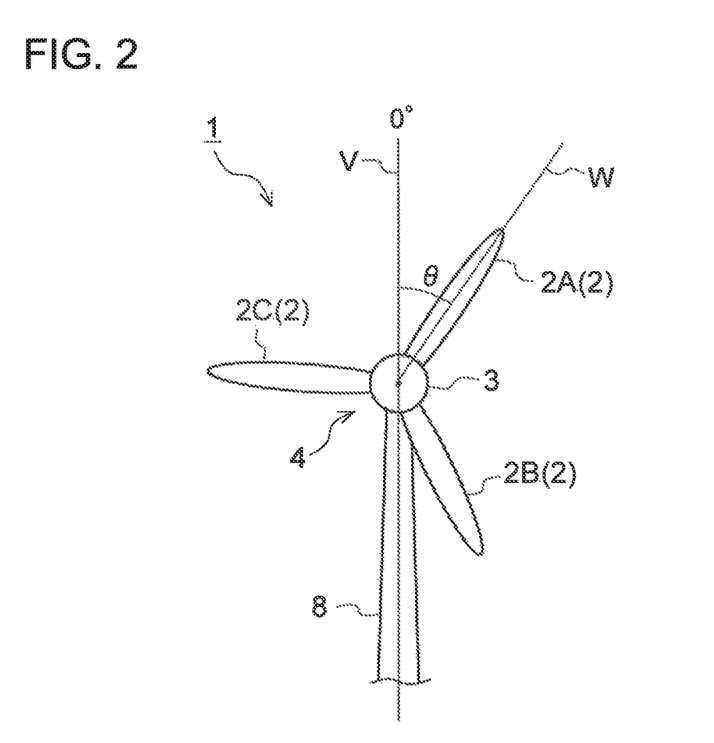
FIG. 2 is a diagram for describing an azimuth angle of a wind turbine.

Firstly, with reference to FIGS. 1 and 2, the overall configuration of a wind turbine 1 according to some embodiments will be described. FIG. 1 is a schematic overall configuration diagram of the wind turbine 1 according to an embodiment. FIG. 2 is a diagram for describing the azimuth angle of the wind turbine 1.

As depicted in FIGS. 1 and 2, the wind turbine 1 according to some embodiments includes a rotor 4 including a wind turbine blade 2 and a hub 3, and a controller 20 for causing the rotor 4 to perform rotor turning so as to stop at a target azimuth angle. The wind turbine 1 may be installed on land, or on water such as ocean and lake. The specific configuration of the controller 20 will be described later.

Here, an azimuth angle is an indicator of the rotational position of the rotor 4, and is an angle θ of a blade 2A (an angle of a blade axis W) with respect to the vertical direction V for instance, as depicted in FIG. 2. In this case, it may be assumed that the azimuth angle θ=0° when the blade 2A is disposed right above.

More specifically, the wind turbine 1 in the embodiment depicted in FIGS. 1 and 2 includes a rotor 4 including at least one blade 2 (2A to 2C) and a hub 3, a rotor shaft 5 configured to rotate together with the rotor 4, a generator 6 configured to be driven by rotational energy of the rotor 4, a nacelle 7 rotatably supporting the rotor 4, and a tower 8 having an upper end to which the nacelle 7 is mounted.

The wind turbine 1 further includes a pitch drive mechanism 12 for adjusting the pitch angle of the wind turbine blade 2. The pitch driving mechanism 12 is controlled by the controller 20 described below.

Furthermore, the wind turbine 1 may further include a brake 10 for braking the rotor 4, or a yaw drive mechanism 14 for yaw-rotating the nacelle 7.

Still further, the wind turbine 1 includes various sensors as needed, such as an angular-position sensor 15 for detecting the azimuth angle of the rotor 4, a rotation-speed meter 16 for detecting the rotation speed of the rotor 4, and an anemometer 17 for measuring the wind velocity around the wind turbine 1. The angular-position sensor 15 may be a rotary encoder or a resolver, for instance.

The specific configuration example of each component of the wind turbine 1 will now be described.

The wind turbine blade 2 is configured such that the pitch angle is adjustable with the pitch drive mechanism 12. In the example depicted in FIG. 2, the wind turbine blade 2 includes three wind turbine blades 2A to 2C mounted radially to the hub 3.

The hub 3 may be provided with a manhole (not depicted) for maintenance. For instance, the manhole is configured to bring an interior space of the hub 3 and another space (e.g. an interior space of the nacelle 7) into communication when the rotor 4 is at a predetermined azimuth angle. In this case, if the rotor 4 is stopped at a predetermined azimuth angle during maintenance, a worker can enter the hub 3 through the manhole to perform maintenance.

The rotor shaft 5 is coupled to the rotor 4 (hub 3), and is configured to rotate with the rotor 4.

The generator 6 is configured such that rotational energy of the rotor 4 is input to the generator 6 via the rotor shaft 5, and thereby the generator 6 generates electric power.

The configuration of a power transmission mechanism 9 for transmitting rotational energy of the rotor 4 to the generator 6 is not particularly limited. The power transmission mechanism 9 may be a direct drive with the rotor 4 and the generator 6 directly coupled to each other via the rotor shaft 5, a hydraulic transmission including a hydraulic pump and a hydraulic motor, or a gear box, for example.

With this configuration, the rotor 4 rotates in response to wind received by the wind turbine blades 2, rotational energy of the rotor 4 is inputted to the generator 6 via the rotor shaft 5 that rotates together with the rotor 4, and the generator 6 generates electric power.

The brake 10 may be a service brake (regular brake) configured to exert a force for braking the rotor 4 when the wind turbine 1 is stopped by normal operation.

For instance, the brake 10 is configured to brake the rotor 4 mechanically by using a friction force. Specifically, the brake 10 has a configuration to brake the rotor 4 by pressing a brake pad against a disc that rotates together with the rotor 4. Alternatively, the brake 10 may be configured to stop the rotor 4 by inserting a lock pin into a lock pin hole formed on a disc that rotates together with the rotor 4.

The yaw drive mechanism 14 is configured to rotate the nacelle 7 in the yaw direction. Specifically, the yaw drive mechanism 14 changes the orientation of the rotor 4 along with that of the nacelle 7 in the yaw direction. During normal operation (power generation) of the wind turbine 1, the yaw drive mechanism 14 performs a yaw-following control so that the orientation of the rotor 4 in the yaw direction is adjusted in accordance with the wind direction.

In this configuration, during normal operation of the wind turbine 1, the yaw drive mechanism 14 performs a yaw-following control so that the orientation of the rotor 4 in the yaw direction changes in accordance with the wind direction. The yaw drive mechanism 14 is set so as not to perform the yaw-following control when the wind turbine 1 is stopped. Furthermore, the pitch drive mechanism 12 controls the pitch angle of the wind turbine blades 2 to the feather side, and the brake 10 brakes the rotor 4, and thereby the rotation of the rotor 4 comes to a stop.

When the wind turbine 1 is stopped, it may become necessary to stop the rotor 4 at a predetermined azimuth angle for maintenance of the like. For instance, when a worker enters the hub 3 through a manhole or checks on the wind turbine blades 2 for maintenance as described above, the controller 20 performs rotor turning so that the rotor 4 reaches a desired azimuth angle.

Figure 3:
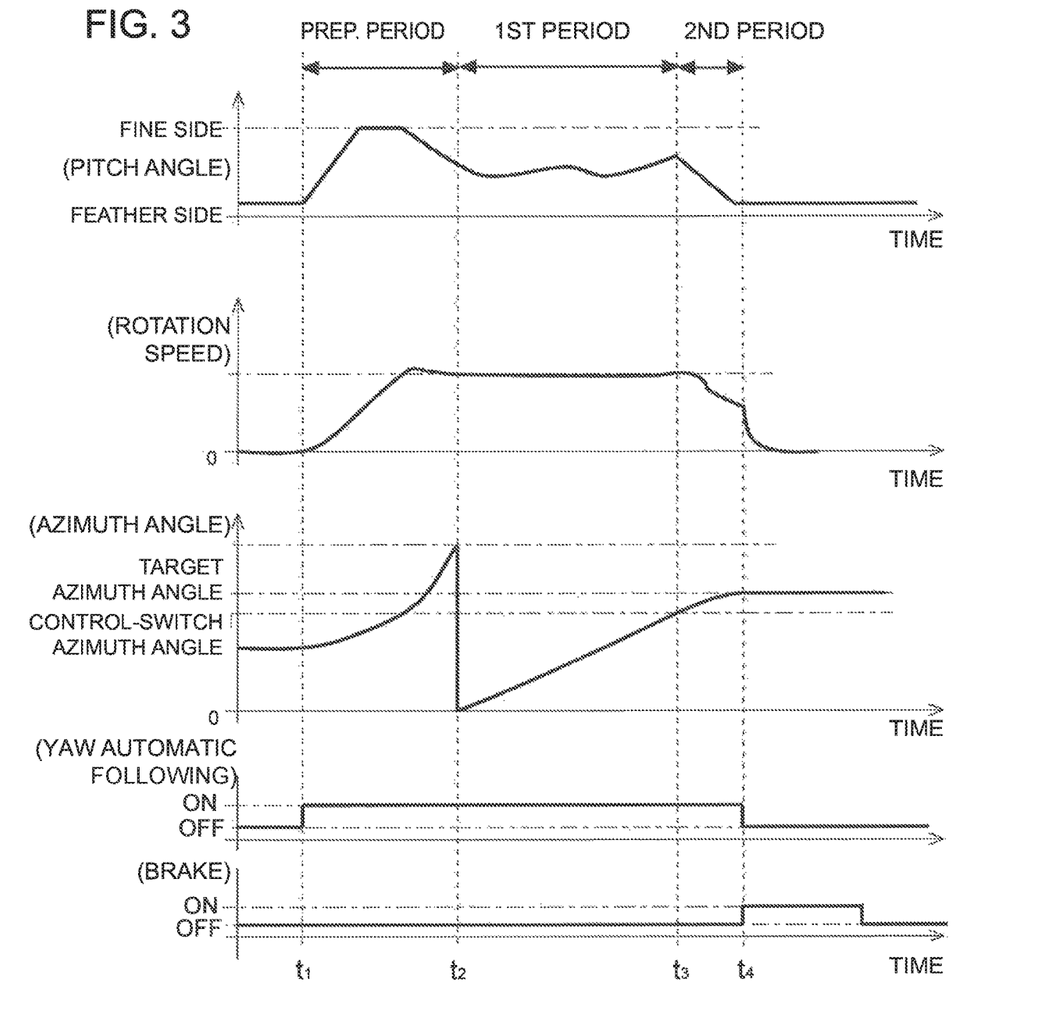
FIG. 3 is a timing chart showing a motion of a wind turbine according to an embodiment.

With reference to FIGS. 1 to 3, the configuration of the controller 20 will be described in detail. FIG. 3 is a timing chart showing motion of the wind turbine 1 according to an embodiment.

In some embodiments, the controller 20 includes an input part 21 to which a target azimuth angle is inputted, and a pitch control part 22 for performing the pitch control.

Furthermore, the controller 20 may include at least one of a calculation part 23 for calculating a control-switch azimuth angle, a brake control part 24 for operating the brake 10 of the wind turbine, or a yaw control part 25 for controlling the yaw drive mechanism 14 to cause the rotor 4 to perform the yaw-following control.

A target azimuth angle is a target rotational position for stopping the rotor 4 by rotor turning when the rotor 4 is rotating. It is desirable that the rotor 4 stops at a target azimuth angle or in the vicinity thereof, after rotor turning.

A switch-control azimuth angle is an azimuth angle at which the pitch control is switched during rotor turning, and is set immediately before the target azimuth angle.

The input part 21 is configured to receive a target azimuth angle at which the rotor 4 of the wind turbine 1 is to be stopped.

Figure 4:
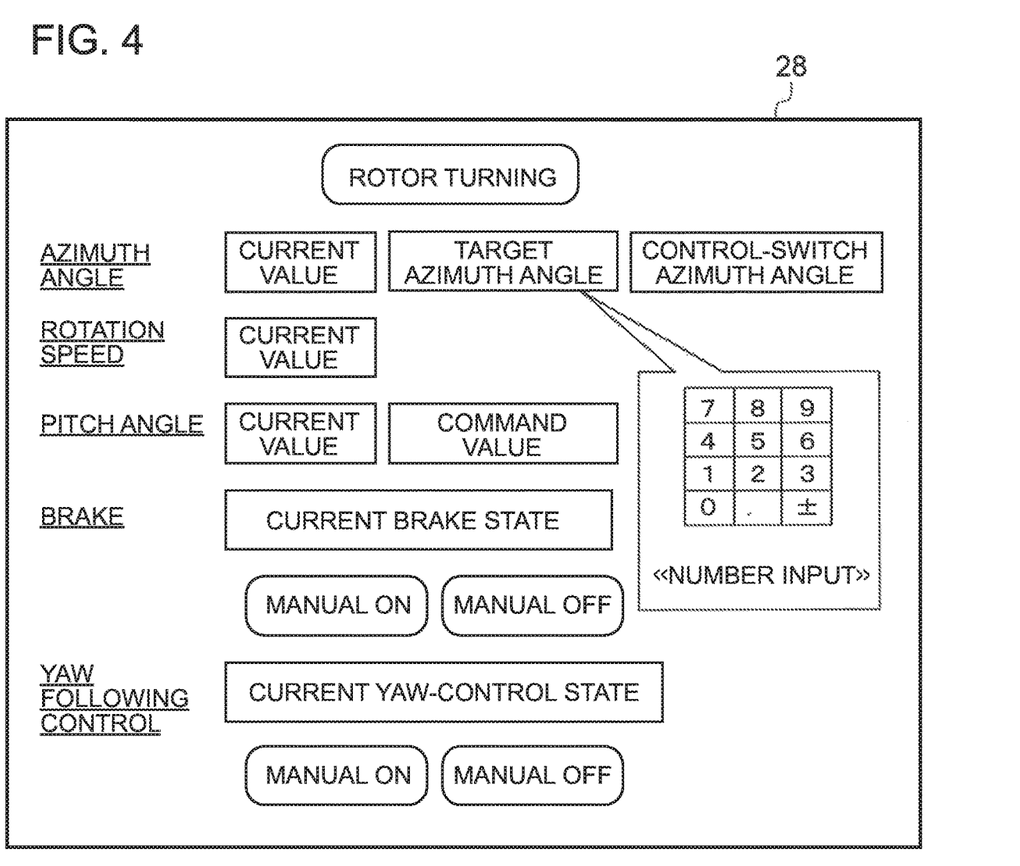
FIG. 4 is a diagram of an example of a display on an operation panel of a terminal according to an embodiment.

As depicted in FIG. 4, the input part 21 may be provided for a terminal having an operation panel 28 for remotely operating the wind turbine 1. FIG. 4 is a diagram of an example of a display on the operation panel 28 of a terminal according to an embodiment. The image may be displayed when a rotor turning operation is selected with the operation panel 28.

Specifically, the operation panel 28 displays a current value of the azimuth angle, a target azimuth angle, and a control-switch azimuth angle. The current value of the azimuth angle may be detected by the angular-position sensor 15 depicted in FIG. 1. The target azimuth angle may be directly inputted through a number-input dialog box which pops up when the region of the target azimuth angle is selected, as depicted on the right side of the drawing. The control-switch azimuth angle may be retrieved from a memory 26 to be displayed, or calculated by the calculation part 23 to be displayed.

Furthermore, the operation panel 28 displays the rotation speed of the rotor 4 (or the rotation speed of the generator 6), a current value and a command value of the pitch angle, a current brake state, manual ON/OFF of the brake, a current yaw-following control state, and manual ON/OFF of the yaw-following control.

In another configuration example, the input part 21 may be provided for the same hardware (e.g. a control board) as the pitch control part 22.

Referring again to FIGS. 1 and 3, the pitch control part 22 is configured to cause the wind turbine 1 to perform the pitch control and to stop the rotor 4 at a target azimuth angle. For instance, the pitch control part 22 may be provided for a control board provided for the wind turbine 1.

Furthermore, as depicted in FIG. 3, the pitch control part 22 is configured to control the pitch angle of the wind turbine blades 2 of the wind turbine 1 so that the rotor 4 rotates constantly at a predetermined rotation speed in the first period to the point of time (time $t_3$) when the rotor 4 reaches the control-switch azimuth angle, and to control the pitch angle so that the rotation speed of the rotor 4 decreases from the predetermined rotation speed in the second period to the point of time (time $t_4$) when the rotor 4 reaches the target azimuth angle after the point of time (time $t_3$) when the rotor 4 reaches the control-switch azimuth angle.

With this configuration, before the rotor 4 is stopped at the target azimuth angle (in the first period), the pitch control part 22 performs the pitch control so that the rotor 4 rotates constantly at a predetermined rotation speed, and thus the aerodynamic torque at the time (time $t_3$) when the rotor 4 reaches the control-switch azimuth angle is substantially constant regardless of the wind velocity. Thus, when the pitch control is performed so as to reduce the rotor rotation speed in the second period after the rotor 4 reaches the control-switch azimuth angle, the rotor 4 can be stopped more easily at the target azimuth angle regardless of the wind velocity.

Figure 5A:
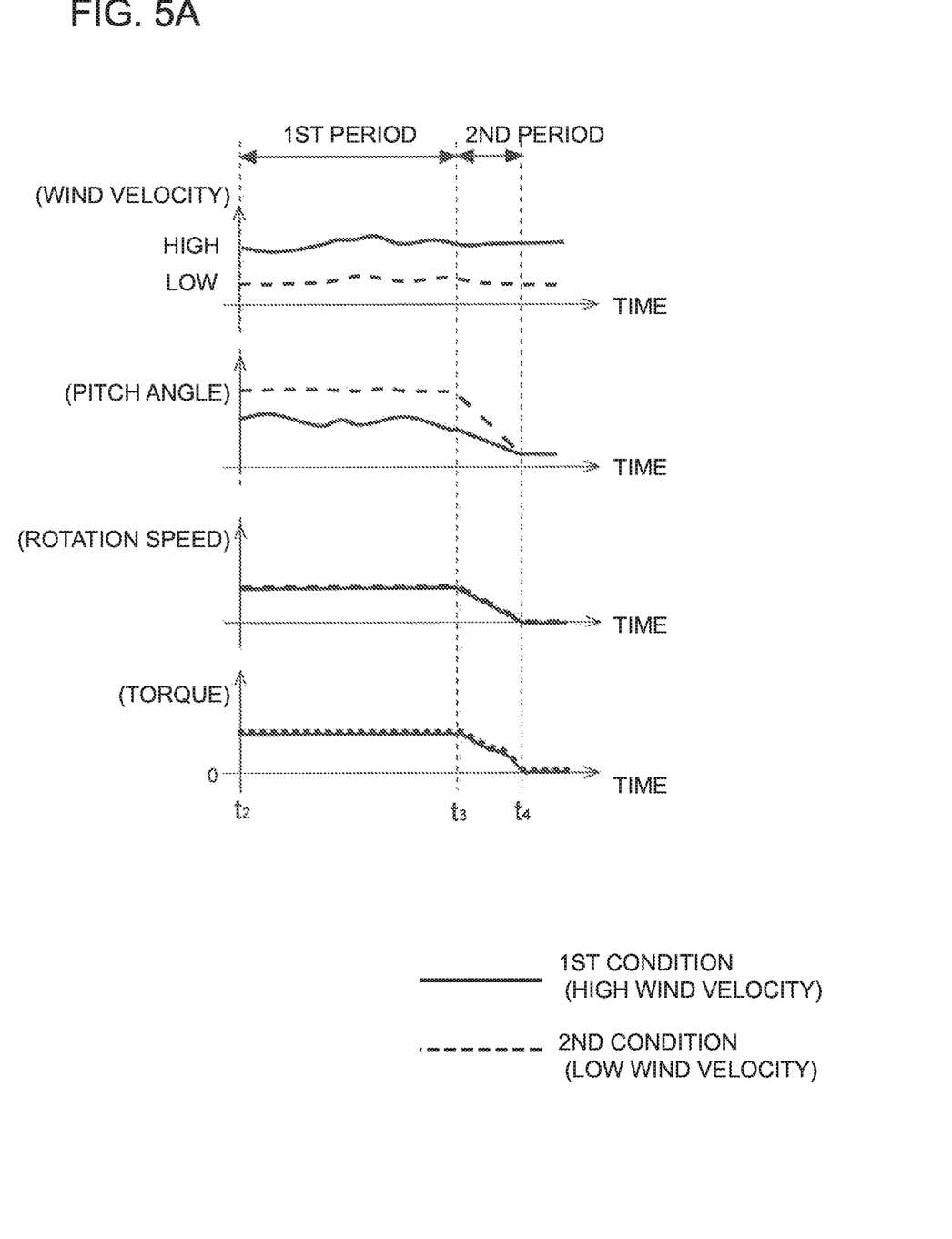
FIG. 5A is a diagram for describing torque that acts on a rotor of a wind turbine to which a controller according to an embodiment is applied.
Figure 5B:
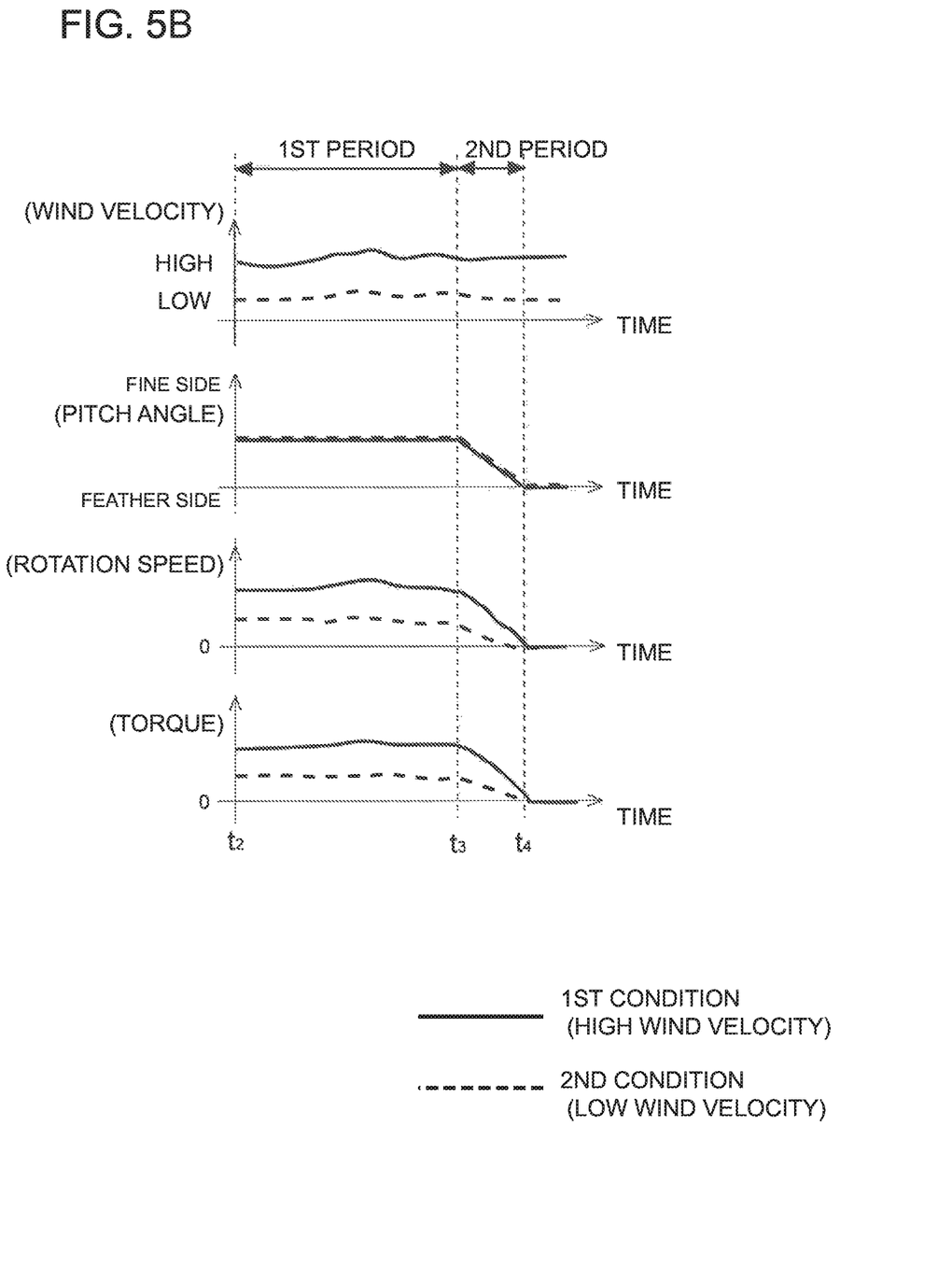
FIG. 5B is a diagram for describing torque that acts on a rotor of a wind turbine of a comparative example.

FIGS. 5A and 5B will now be referred to for more detailed description. FIG. 5A is a diagram for describing torque (aerodynamic torque) that acts on the rotor 4 of the wind turbine 1 to which the controller 20 according to an embodiment is applied. FIG. 5B is a diagram for describing torque (aerodynamic torque) that acts on a rotor of a wind turbine of a comparative example. The drawings show behavior of each component for two different wind-velocity conditions.

First, with reference to FIG. 5B, the rotor turning of the wind turbine of a comparative example will be described. In the comparative example, performed is a control for maintaining the pitch angle to be constant during rotor turning. For the wind-velocity changes from moment to moment, the rotation speed and the torque also change in accordance with the change in the wind velocity, if the pitch angle is maintained to be constant during rotor turning. Furthermore, the rotation speed and the torque are higher under the first condition in which the wind velocity is high, and smaller under the second condition in which the wind velocity is low. Thus, the torque is unstable at the point of time (time $t_3$) when the rotor 4 reaches the control-switch azimuth angle.

In contrast, in a case of the wind turbine 1 according to the above embodiment depicted in FIG. 5A, before the rotor 4 is stopped at the target azimuth angle (in the first period), the pitch control part 22 performs the pitch control so that the rotor 4 rotates constantly at a predetermined rotation speed. Accordingly, the rotation speed and the torque are constant regardless of the change in the wind velocity, and the constant rotation speed and torque are maintained under both of the first condition with a high wind velocity and the second condition with a low wind velocity. Thus, the torque is substantially constant regardless of the wind velocity at the point of time (time $t_3$) when the rotor 4 reaches the control-switch azimuth angle, and thereby it is possible to perform the pitch control stably in the second period.

Thus, even if the limit on the wind-velocity condition for determining whether to perform rotor turning is not strict, it is possible to improve the accuracy in stopping the rotor 4 at the target azimuth angle regardless of an influence from the wind-velocity.

The controller 20 can be applied to any type of wind turbine 1 as long as the wind turbine 1 is configured such that the pitch angle is controllable. For instance, besides to the wind turbine 1 that can be equipped with a mechanical turbine device such as the wind turbine 1 with a gear-type speed increaser, the controller 20 can be also applied to a wind turbine 1 of a direct-drive type or a hydraulic-drive type, for instance. Thus, it is possible to provide a versatile turning mechanism.

The predetermined rotation speed may be not less than 0.05 rpm and not more than 1.0 rpm.

Since the rotor rotation speed (predetermined speed) maintained to be constant in the first period is in the above range, which is of a relatively low rotation speed, it is possible to shorten the second period and to reduce aerodynamic torque received from wind at the time of starting speed reduction (the time when the rotor 4 reaches the control-switch azimuth angle), which makes it easier to stop the rotor 4 at the target azimuth angle regardless of the wind velocity.

Referring again to FIG. 1, each embodiment for setting the control-switch azimuth angle with the pitch control part 22 will be described.

Figure 6:
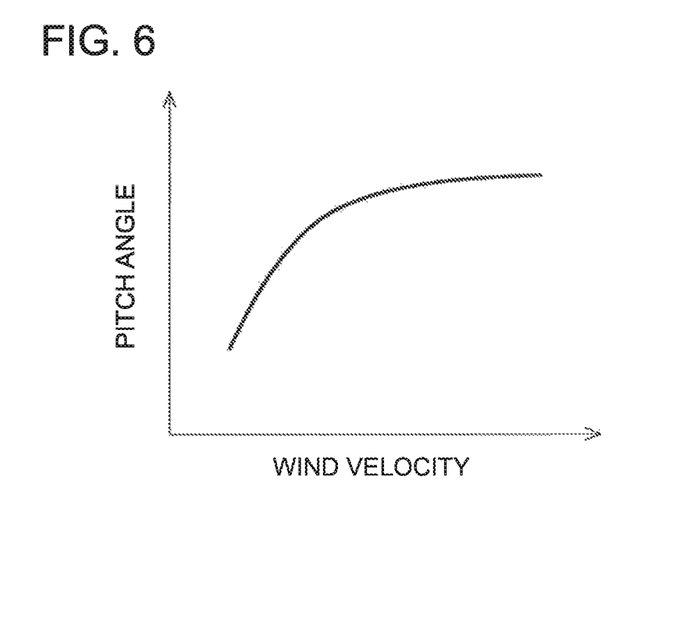
FIG. 6 is a graph showing a relationship between wind velocity and pitch angle during a pitch control (a rotor constant rotation-speed control).

As described above, the pitch control part 22 performs the pitch control so that the rotor 4 rotates constantly at a predetermined rotation speed in the first period. In such a pitch control (rotor constant rotation-speed control), the pitch angle of the wind turbine blades 2 changes in accordance with the wind velocity as depicted in FIG. 6. FIG. 6 is a graph showing a relationship between wind velocity and pitch angle during a pitch control (a rotor constant rotation speed control).

Furthermore, in the pitch control, the pitch drive mechanism 12 normally changes the pitch angle of the wind turbine blades 2 at a predetermined pitch rate.

Figure 7:
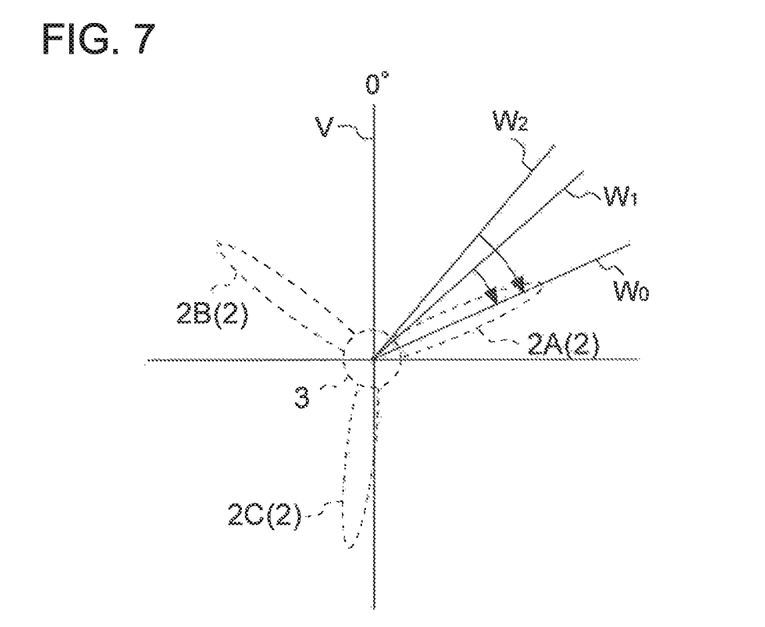
FIG. 7 is a diagram for describing a control-switch azimuth angle.

Thus, in the second period, when the wind turbine blades 2 are returned to a full-feather pitch angle, which is a pitch angle of a stopped wind turbine, or to a pitch angle close to the full-feather pitch angle, it takes different lengths of time to return the wind turbine blades to the pitch angle of a stopped wind turbine, depending on the pitch angle at the point of time (time $t_3$) when the rotor 4 reaches the control-switch azimuth angle. That is, as depicted in FIG. 7, if the pitch angle of the wind turbine blades 2 is small at the time (time $t_3$) when the rotor 4 reaches the control-switch azimuth angle, it takes only a shorter length of time to return the pitch angle to the pitch angle of a stopped wind turbine at the time of reaching (time $t_3$), and thus the rotational angle between the target azimuth angle position $W_0$ and the control-switch azimuth angle position $W_1$ may be small. However, if the pitch angle of the wind turbine blades 2 is large at the time (time $t_3$) when the rotor 4 reaches the control-switch azimuth angle, it takes a longer length of time to return the pitch angle to the pitch angle of a stopped wind turbine at the time of reaching (time $t_3$), and thus it is necessary to ensure a sufficient rotational angle between the target azimuth angle position $W_0$ and the control-switch azimuth angle position $W_2$.

As described above, if the pitch control is performed so that the rotor 4 rotates constantly at a predetermined rotation speed in the first period, it is desirable to set a control-switch azimuth angle appropriately, for the sake of shock mitigation and accurate stop when the brake is operated.

In an embodiment, the pitch control part 22 may be configured to retrieve a control-switch azimuth angle from the memory 26 storing the control-switch azimuth angle in advance. In this case, the control-switch azimuth angle retrieved from the memory 26 may be a fixed value set specifically for each wind turbine 1. Alternatively, the memory 26 may store a plurality of control-switch azimuth angles, from which one control-switch azimuth angle is to be retrieved. For instance, the memory 26 stores a table of a plurality of control-switch azimuth angles associated with a parameter related to wind velocity. A control-switch azimuth angle is selected in accordance with a value measured at the side of the wind turbine 1 for the parameter related to wind velocity. Specifically, if the parameter related to wind velocity is a wind velocity, a control-switch azimuth angle is selected from the table in accordance with the wind velocity measured by the anemometer 17.

Thus, complicated calculation is not necessary, and as described above, even if the limit on the wind-velocity condition for determining whether to perform rotor turning is not strict, it is possible to improve the accuracy in stopping the rotor 4 at the target azimuth angle regardless an influence from the wind-velocity.

In another embodiment, the controller 20 includes the calculation part 23 configured to calculate a control-switch azimuth angle on the basis of at least one of the pitch angle in the first period or the wind velocity in the first period.

In the first period, the pitch control is performed so as to maintain the rotation speed to be constant, and thus the pitch angle of the wind turbine blades 2 in the first period can be used as an index of the magnitude of the wind velocity.

Thus, with the calculation part 23 configured to calculate a control-switch azimuth angle on the basis of at least one of the pitch angle or the wind velocity in the first period, it is possible to adjust the time of starting speed reduction of the rotor (the time when the rotor 4 reaches the control-switch azimuth angle, or time $t_3$) in accordance with the magnitude of the wind velocity. Accordingly, the rotor 4 can be more easily stopped at the target azimuth angle with high accuracy regardless of the wind velocity.

Furthermore, the pitch control part 22 may be configured to change the pitch angle to the feather side at a constant rate, in at least a part of the second period.

Accordingly, since the pitch angle is changed to the feather side at a constant rate in at least a part of the second period, it is unnecessary to perform complicated calculation to obtain a target pitch angle in the second period.

Alternatively, the pitch control part 22 may be configured to reduce the rotation speed of the rotor 4 at a constant rate, in at least a part of the second period.

Accordingly, it is possible to reduce the speed of the rotor 4 at a constant rate in at least a part of the second period, and thus to stop the rotor 4 at the target azimuth angle with high accuracy.

Furthermore, the pitch control part 22 may be configured to control the pitch angle in a range defined by the fine-side limit of the pitch angle in the first period.

In this way, since the fine-side limit of the pitch angle is set, the pitch angle is positioned relatively close to the feather side at the time of starting the speed reduction (the time when the rotor 4 reaches the control-switch azimuth angle, or time $t_3$), and thereby the rotor 4 can be stopped more easily at the target azimuth angle regardless of the wind velocity.

Furthermore, the brake control part 24 depicted in FIG. 1 may be configured to operate the brake 10 of the wind turbine 1 at the time (time $t_4$) when the rotor 4 reaches the target azimuth angle (see FIG. 3).

Accordingly, the brake control part 24 retains the rotor 4 at the target azimuth angle by a brake operation.

Furthermore, the yaw control part 25 depicted in FIG. 1 is configured to control the rotor 4 so that the following control is performed on the rotor 4 in the yaw direction in accordance with the wind direction during the pitch control in the first period and the second period.

Accordingly, the yaw control part 25 controls the yaw direction to follow the wind direction in the first period and the second period, and thereby it is possible to perform rotor turning appropriately by the pitch control regardless of the wind direction.

A program for rotor turning according to some embodiments is a program for rotor turning used for the controller 20 according to the above described embodiments.

The program for rotor turning is configured to cause the controller 20 to perform a step of controlling the pitch angle of the wind turbine blades 2 of the wind turbine 1 so that the rotor 4 rotates constantly at a predetermined rotation speed in the first period to the point of time when the rotor 4 reaches the control-switch azimuth angle immediately before the target azimuth angle, and a step of controlling the pitch angle so that the rotation speed of the rotor 4 decreases from the predetermined rotation speed in the second period before the rotor 4 reaches the target azimuth angle and after the rotor 4 reaches the control-switch azimuth angle.

With the above program for rotor turning, even if the limit on the wind-velocity condition for determining whether to perform rotor turning is not strict, it is possible to improve the accuracy in stopping the rotor 4 at the target azimuth angle regardless of an influence from the wind-velocity.

Figure 8:
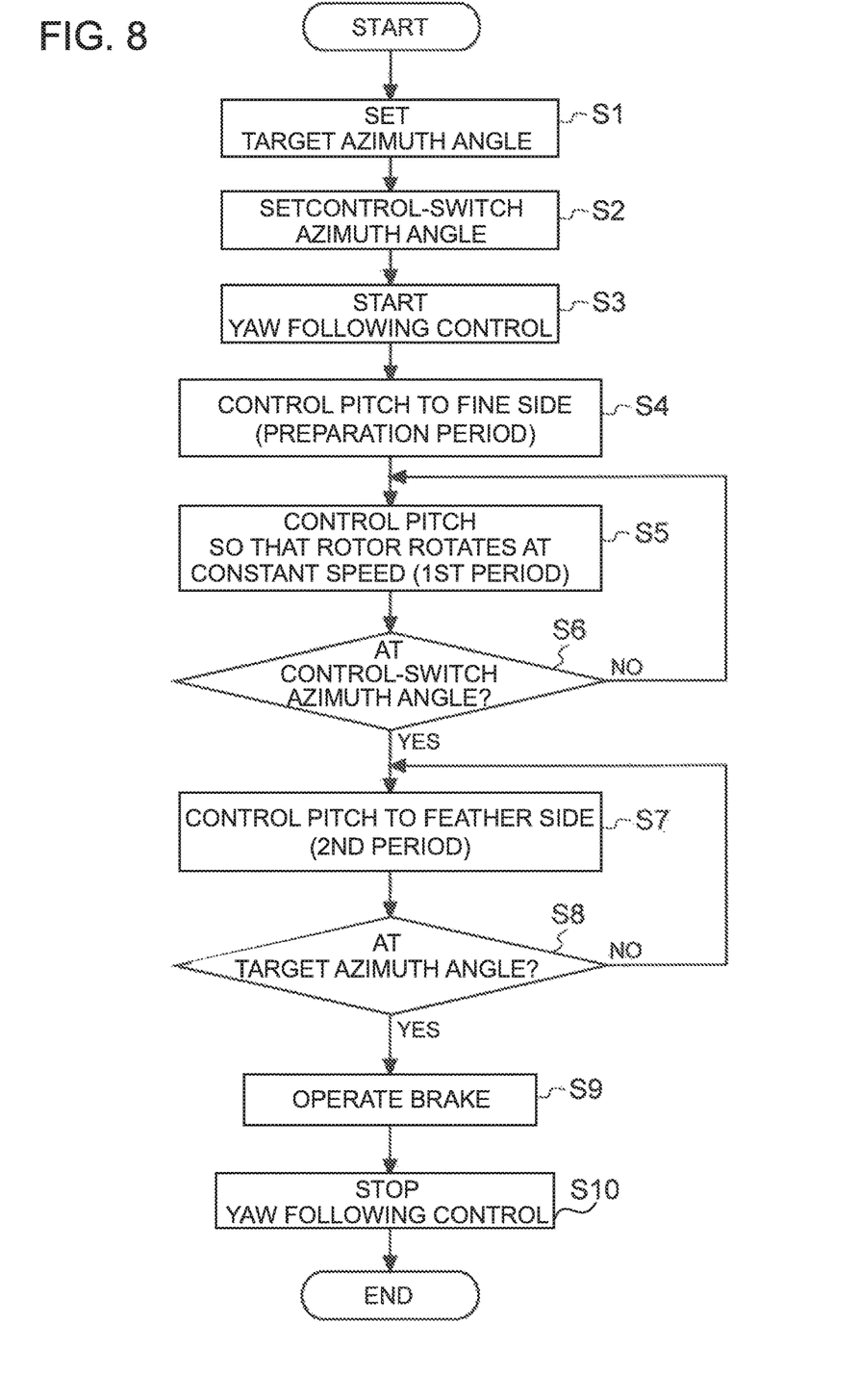
FIG. 8 is a flowchart of a method of controlling a wind turbine according to an embodiment.

Next, with reference to FIGS. 3 and 8, a method of rotor turning of the wind turbine 1 will be described. FIG. 8 is a flowchart of a method of controlling the wind turbine 1 according to an embodiment. The following description will refer to the reference signs used in FIGS. 1 and 2.

The method of rotor turning according to some embodiments includes a stopping step of causing the wind turbine 1 to perform the pitch control to stop the rotor 4 of the wind turbine 1 at the target azimuth angle.

In the stopping step, the pitch angle of the wind turbine blades 2 of the wind turbine 1 is controlled so that the rotor 4 rotates constantly at a predetermined rotation speed in the first period to the point of time when the rotor 4 reaches the control-switch azimuth angle immediately before the target azimuth angle (S5 in FIG. 8). Furthermore, in the stopping step, the pitch angle is controlled so that the rotation speed of the rotor 4 decreases from the predetermined rotation speed in the second period before the rotor 4 reaches the target azimuth angle and after the rotor 4 reaches the control-switch azimuth angle (S7 in FIG. 8).

According to the above method, before the rotor 4 is stopped at the target azimuth angle (in the first period), the pitch control is performed so that the rotor 4 rotates constantly at a predetermined rotation speed, and thus the aerodynamic torque at the time when the rotor 4 reaches the control-switch azimuth angle is substantially constant regardless of the wind velocity. Thus, when the pitch control is performed so that the rotor rotation speed decreases in the second period after the rotor 4 reaches the control-switch azimuth angle, the rotor 4 can be stopped more easily at the target azimuth angle regardless of the wind velocity. Thus, even if the limit on the wind-velocity condition for determining whether to perform rotor turning is not strict, it is possible to improve the accuracy in stopping the rotor 4 at the target azimuth angle regardless of an influence from the wind-velocity.

Furthermore, in the stopping step, the pitch angle may be changed to the feather side at a constant rate, in at least a part of the second period (S7 in FIG. 8).

Accordingly, since the pitch angle is changed to the feather side at a constant rate in at least a part of the second period, it is unnecessary to perform complicated calculation to obtain a target pitch angle in the second period.

Alternatively, in the stopping step, the rotation speed of the rotor 4 may be reduced at a constant rate, in at least a part of the second period (S7 in FIG. 8).

Accordingly, it is possible to reduce the rotation speed of the rotor 4 at a constant rate in at least a part of the second period, and thus to stop the rotor 4 at the target azimuth angle with high accuracy.

In the above embodiment, the method may further include a step of calculating a control-switch azimuth angle on the basis of at least one of the pitch angle in the first period or the wind velocity in the first period.

Accordingly, a control-switch azimuth angle is calculated on the basis of at least one of the pitch angle or the wind velocity in the first period, it is possible to adjust the time of starting speed reduction of the rotor (the time when the rotor reaches the control-switch azimuth angle) in accordance with the magnitude of the wind velocity. Accordingly, the rotor 4 can be stopped more easily at the target azimuth angle with high accuracy regardless of the wind velocity.

The embodiment depicted in FIG. 8 will now be described in detail.

In the method of rotor turning depicted in FIG. 8, the target azimuth angle is set in response to a rotor-turning operation command (time $t_1$ in FIG. 3) (S1). If a control-switch azimuth angle is to be retrieved from the memory 26, the control-switch azimuth angle may be set here (S2). It should be noted that, if the control-switch azimuth angle is to be set in accordance with the wind velocity or the pitch angle during rotor turning, the control-switch azimuth angle may be set during execution of the pitch control (S5) in the first period described below.

After the target azimuth angle is set, the yaw-following control is started (S3), and the pitch control is performed so that the pitch angle of the wind turbine blades 2 changes toward the side of the fine pitch angle (S4). During this step, the brake 10 is OFF. Here, the period after the start of rotor turning and before the first period is referred to as a preparation period.

After the rotor rotation speed increases to a predetermined rotation speed, (time $t_2$ in FIG. 3), the pitch control is performed so that the rotor 4 rotates at a predetermined rotation speed in the first period (S5). In this step, the pitch angle may be controlled in a range defined by the fine-side limit of the pitch angle.

It is determined whether the pitch angle of the wind turbine blades 2 is at the control-switch azimuth angle (S6), and when the pitch angle of the wind turbine blades 2 reaches the control-switch azimuth angle (time $t_3$), the pitch control is performed so that the pitch angle of the wind turbine blades 2 changes to the side of the feather pitch angle in the second period (S7). In this step, the pitch angle may be changed to the feather side at a constant rate, in at least a part of the second period. Alternatively, the rotation speed of the rotor 4 may be reduced at a constant rate, in at least a part of the second period.

In the second period, it is determined whether the pitch angle of the wind turbine blades 2 is at the target azimuth angle (S8), and when the pitch angle of the wind turbine blades 2 reaches the target azimuth angle (time $t_4$), the brake 10 is turned ON to operate (S9), and the yaw-following control is stopped (S10).

The wind turbine 1 according to some embodiments includes, as depicted in FIG. 1, the rotor 4 and the controller 20 of one of the above described embodiments.

As described above, the wind turbine 1 includes the controller 20 capable of improving the accuracy in stopping the rotor 4 at the target azimuth angle regardless of an influence from the wind velocity, and thus it is possible to provide the wind turbine 1 that enables maintenance with a high efficiency, for instance.

As described above, according to at least some embodiments of the present invention, even if the limit on the wind-velocity condition for determining whether to perform rotor turning on the wind turbine 1 is not strict, it is possible to improve the accuracy in stopping the rotor at the target azimuth angle regardless of an influence from the wind-velocity.

Embodiments of the present invention were described in detail above, but the present invention is not limited thereto, and various amendments and modifications may be implemented.

Specifically, while the wind turbine 1 is in a stopped state while being rotated to the target azimuth angle in rotor turning for maintenance or the like, the state of the wind turbine 1 is not necessarily limited to this in rotor turning by the controller 20. For instance, the controller 20 may perform rotor turning while the wind turbine 1 is being stopped.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A controller of a wind turbine for causing the wind turbine to perform rotor turning, comprising:
   an input part to which a target azimuth angle at which a rotor of the wind turbine is to be stopped is inputted; and
   a pitch control part for performing a pitch control to stop the rotor at the target azimuth angle,
   wherein the pitch control part is configured to:
   control a pitch angle of a wind turbine blade of the wind turbine so that the rotor rotates at a predetermined rotation speed which is constant, in a first period until the rotor reaches a control-switch azimuth angle immediately before the target azimuth angle; and
   control the pitch angle so that a rotation speed of the rotor decreases from the predetermined rotation speed in a second period after the rotor reaches the control-switch azimuth angle and before the rotor reaches the target azimuth angle,
   wherein, during the second period, a brake of the wind turbine is deactivated and is activated upon reaching the target azimuth angle, and
   the controller further comprises a calculation part for calculating the control-switch azimuth angle on a basis of at least one of the pitch angle in the first period or a wind-velocity in the first period.

2. The controller of a wind turbine according to claim 1, wherein the pitch control part is configured to retrieve the control-switch azimuth angle from a memory storing the control-switch azimuth angle in advance.

3. The controller of a wind turbine according to claim 1, wherein the pitch control part is configured to change the pitch angle to a feather side at a constant rate in at least a part of the second period.

4. The controller of a wind turbine according to claim 1, wherein the pitch control part is configured to reduce the rotation speed of the rotor at a constant rate in at least a part of the second period.

5. The controller of a wind turbine according to claim 1, wherein the predetermined rotation speed is not less than 0.05 rpm and not more than 1.0 rpm.

6. The controller of a wind turbine according to claim 1, further comprising
   a brake control part configured to operate a brake for braking the rotor when the rotor reaches the target azimuth angle.

7. The controller of a wind turbine according to claim 1, further comprising
   a yaw control part for performing a following control on a yaw direction of the rotor in accordance with a wind direction when the pitch angle is controlled in the first period and the second period.

8. A wind turbine, comprising:
   a rotor; and
   the controller according to claim 1 for performing a rotor-turning operation so that the rotor stops at the target azimuth angle.

9. The controller of a wind turbine according to claim 1, wherein the brake of the wind turbine is activated upon reaching the target azimuth angle to complete a rotor turning for maintenance of the wind turbine.

10. A program for rotor turning for a controller of a wind turbine for causing the wind turbine to perform rotor turning, the controller comprising:
    an input part to which a target azimuth angle at which a rotor of the wind turbine is to be stopped is inputted; and
    a pitch control part for performing a pitch control to stop the rotor at the target azimuth angle,
    the program being configured to cause the controller to perform:
    a step of controlling a pitch angle of the wind turbine blade of the wind turbine so that the rotor rotates at a predetermined rotation speed which is constant, in a first period until the rotor reaches a control-switch azimuth angle immediately before the target azimuth angle; and
    a step of controlling the pitch angle so that a rotation speed of the rotor decreases from the predetermined rotation speed in a second period after the rotor reaches the control-switch azimuth angle and before the rotor reaches the target azimuth angle,
    wherein, during the second period, a brake of the wind turbine is deactivated and is activated upon reaching the target azimuth angle, and
    the program being configured to cause the controller to perform a step of calculating the control-switch azimuth angle on a basis of at least one of the pitch angle in the first period or a wind velocity in the first period.

11. A method of rotor turning for a wind turbine, comprising, a stop step of causing the wind turbine to perform a pitch control to stop a rotor of the wind turbine at a target azimuth angle, wherein the stop step further comprises:

controlling a pitch angle of a wind turbine blade of the wind turbine so that the rotor rotates at a predetermined rotation speed which is constant, in a first period until the rotor reaches a control-switch azimuth angle immediately before the target azimuth angle; and controlling the pitch angle so that a rotation speed of the rotor decreases from the predetermined rotation speed in a second period after the rotor reaches the control-switch azimuth angle and before the rotor reaches the target azimuth angle, and wherein, during the second period, a brake of the wind turbine is deactivated and is activated upon reaching the target azimuth angle, and the method further comprises a step of calculating the control-switch azimuth angle on a basis of at least one of the pitch angle in the first period or a wind velocity in the first period.

12. The method of rotor turning according to claim 11, wherein, in the stop step, the pitch angle is changed to a feather side at a constant rate in at least a part of the second period.

13. The method of rotor turning according to claim 11, wherein, in the stop step, the rotation speed of the rotor is reduced at a constant rate in at least a part of the second period.

* * * * *